United States Patent [19]
Parkin

[11] Patent Number: 5,924,698
[45] Date of Patent: Jul. 20, 1999

[54] MECHANICAL SEAL

[76] Inventor: Andrew Parkin, 29 Spruce Avenue, Wickersley, Rotherham, South Yorkshire, United Kingdom, S66 2PE

[21] Appl. No.: 08/919,954

[22] Filed: Aug. 29, 1997

[30]        Foreign Application Priority Data

Sep. 2, 1996 [GB] United Kingdom .................... 9618263

[51] Int. Cl.[6] ....................................................... F16J 15/34
[52] U.S. Cl. ........................................... 277/370; 277/358
[58] Field of Search ...................................... 277/370, 358

[56]                References Cited

U.S. PATENT DOCUMENTS

| | | | |
|---|---|---|---|
| 4,183,541 | 1/1980 | Wentworth, Jr. ......................... | 277/379 |
| 4,836,561 | 6/1989 | Lebeck et al. ........................... | 277/400 |
| 5,020,809 | 6/1991 | Mullaney ................................. | 277/370 |
| 5,067,733 | 11/1991 | Nagai et al. ............................ | 277/370 |
| 5,275,421 | 1/1994 | Hornsby ................................... | 277/370 |
| 5,354,070 | 10/1994 | Carmody ................................. | 277/370 |
| 5,441,282 | 8/1995 | Ciotola ................................ | 277/370 X |
| 5,490,682 | 2/1996 | Radosav et al. ........................ | 277/370 |
| 5,571,268 | 11/1996 | Azibert ................................ | 277/370 X |
| 5,577,738 | 11/1996 | Fukuda ................................... | 277/370 |

*Primary Examiner*—Anthony Knight
*Assistant Examiner*—Alison K. Pickard
*Attorney, Agent, or Firm*—Edwin D. Schindler

[57]           ABSTRACT

A mechanical seal provides sealing between a rotatable shaft and a housing. The seal has a stationary part for connection to the housing and a rotary part for rotation with the shaft. Mating sealing faces are carried by the stationary and rotary parts. At least that portion of the rotary part carrying the rotary sealing face is capable of at least limited axial movement relative to the shaft.

4 Claims, 1 Drawing Sheet

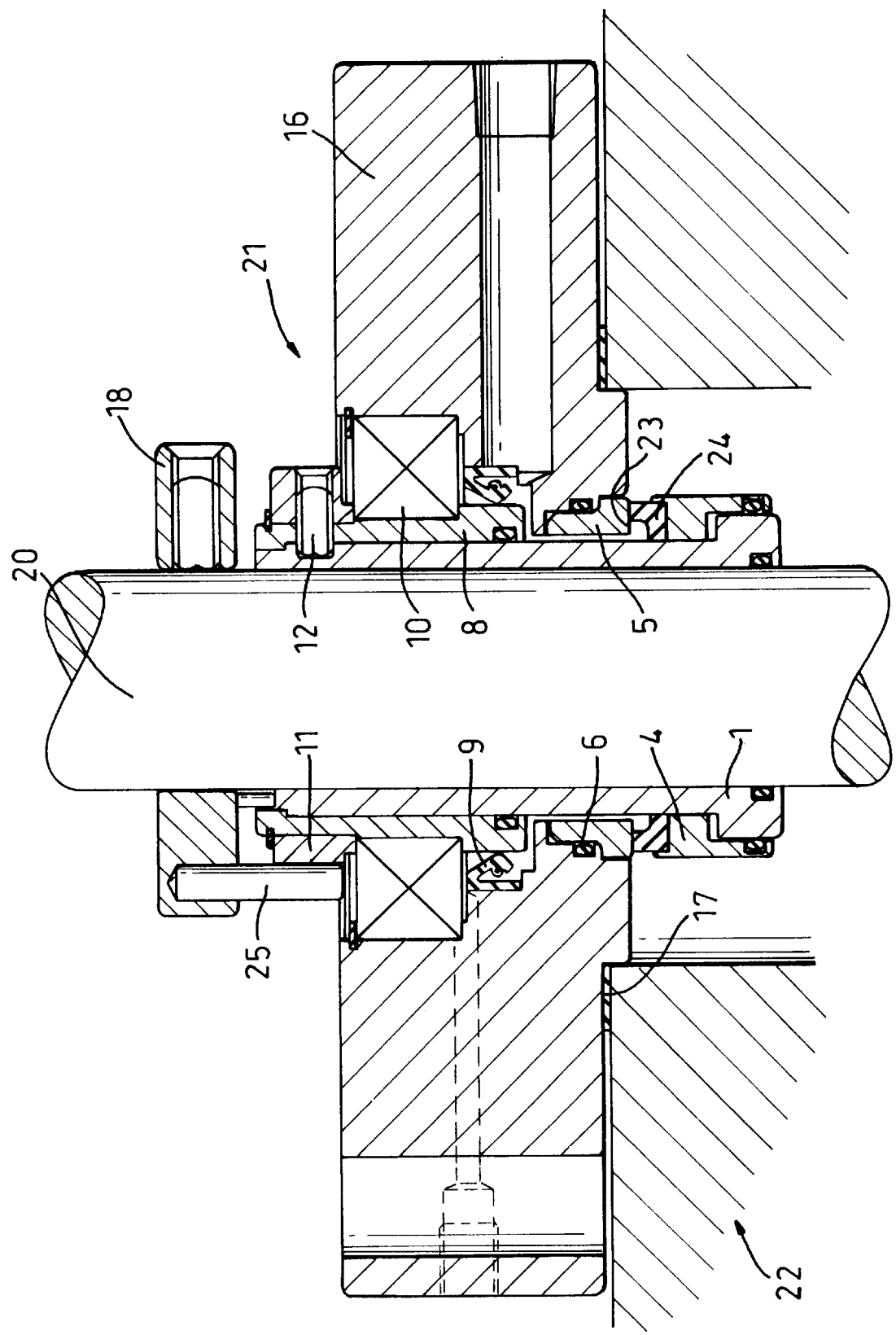

MECHANICAL SEAL

BACKGROUND OF THE INVENTION

1. Technical Field of the Invention

This invention relates to mechanical seals for providing a fluid-tight seal between a rotatable shaft and a housing. This invention relates particularly, but not exclusively, to package or cartridge mechanical seals to which reference will be made hereinafter.

2. Description of the Prior Art

Cartridge seals with integral bearings are known and are particularly useful in applications where radial support is required, an example being a mixing vessel having a long shaft which is subject to shaft whip. In certain applications, there is a need not only to provide radial support but also to allow for a certain amount of axial movement. An example of such an application is a vertical spindle pump.

SUMMARY OF THE INVENTION

According to the present invention there is provided a mechanical seal to provide sealing between a rotatable shaft and a housing, the seal having a stationary part for connection to the housing and a rotary part for rotation with the shaft, mating sealing faces being carried by said stationary and rotary parts, said rotary parts being for mounting on the drive shaft for rotation therewith and at least that portion of the rotary part carrying the rotary sealing face being capable of at least limited axial movement relative to the shaft.

Preferably, the rotary part includes a first portion carrying the rotary face and a second portion for attachment to the drive shaft for rotation and axial movement therewith, the first and second portions being, in the assembled seal, in rotational engagement with each other but allowing at least united axial movement therebetween.

More preferably said second portion is in the form of a collar for location on the drive shaft adjacent said first portion, drive means extending between said collar and said fist portion to provide rotational driving engagement therebetween but permitting at least limited axial movement therebetween. The drive means may be in the form of at least one drive pin fixed to one of the collar and the first portion but extending into a groove, hole or recess located in the other of said collar and said first portion, thereby allowing axial movement therebetween.

Rather than providing a collar for securing to the drive shaft, the rotary part of the seal may be provided with means for engaging in at least one axially extending groove or keyway located in the drive shaft so as to permit said axial movement.

In a cartridge seal in accordance with the present invention, the rotary part may include a sleeve for location on the drive shaft, other components of the seal being located around the sleeve. The sleeve is not for fixing securely of the drive shaft but will at least permit relative axial movement therebetween.

BRIEF DESCRIPTION OF THE DRAWING FIGURE

In the single drawing FIGURE, a preferred embodiment of the present invention is illustrated, in which a longitudinal section of a seal of the invention, located around a shaft, is shown.

DETAILED DESCRIPTION OF THE DRAWING AND PREFERRED EMBODIMENTS

Referring to the accompanying drawing, a shaft 20 may form part of a vertical spindle pump. A cartridge seal 21 provides sealing between the interior and exterior of the pump body and includes a gland 16 which is connected to the pump body 22 and is provided with a gasket 17 located therebetween. Located radially inwardly of gland 16, and at its lower corner (as viewed in the drawing) is a stationery ring 5 which carries a stationery sealing face 23.

Also carried by, and located radially inwardly of, gland 16 is an annular bearing 10 and a lip seal 9. Bearing 10 includes a ball or roller race (not shown).

The above described components of the seal form the stationery part and largely surround the rotary part which includes a sleeve 1 for location about shaft 20. Located between sleeve 1 and bearing 10 is a bearing sleeve 8. A clamp ring 11 is located to one side of bearing 10 and is clamped to sleeve 1 by means of lock screws 12 which extend through bearing sleeve 8. At the other end of sleeve 1 there is located a ring 4 which is provided with a sealing ring 24 having a sealing face which bears against sealing face 23 of stationery ring 5.

The above described main members of the rotary part of the seal are, as illustrated in the drawing, mounted about shaft 20 but are not connected to the shaft. Rotational driving connection between the shaft and the rotary part of the seal is provided by means of a collar 18 which is secured to the shaft 20. Two drive pins 25 are each fixed at one end within collar 18 and extend, parallel to the axis of shaft 20, in a direction towards clamp ring 11. Ring 11 is provided with two peripheral grooves, each of which accommodates a respective drive pin 25, allowing sliding movement between the drive pins 25 and clamp ring 11. As shown in the drawings, the collar 18 is at its closest position to the rotary part of the seal, but upward (as seen in the drawing) movement of the shaft 20 in collar 18 is permitted to an amount of up to 0.375 inch without affecting adversely the rotational driving engagement between the shaft and the rotary part of the seal, effected through collar 18 and drive pins 25. Larger axial movements can, of course, be accommodated by changing the length of the drive pins 25.

I claim:

1. A mechanical seal to provide sealing between a rotatable shaft and a housing, the seal having a stationary part for connection to the housing and a rotary part for rotation with the shaft, said stationary part being provided with a bearing and said rotary part being provided with a sleeve located about said shaft, mating sealing faces being carried by said stationary and rotary parts, and a bearing sleeve being located between said bearing and said rotatable shaft, said rotary part being for mounting on the rotatable shaft for rotation therewith and at least that portion of the rotary part carrying the rotary sealing face being capable of at least limited axial movement relative to the shaft and said limited axial movement being minimized via said bearing sleeve.

2. A mechanical seal according to claim 1 wherein the rotary part includes a first portion carrying the rotary face and a second portion for attachment to the drive shaft for rotation and axial movement therewith, the first and second portions being, in the assembled seal, in rotational engagement with each other but allowing at least limited axial movement therebetween.

3. A mechanical seal according to claim 2 wherein the second portion is in the form of a collar for location on the drive shaft adjacent said first portion, drive means extending between said collar and said first portion to provide rotational driving engagement therebetween but permitting at least limited axial movement therebetween.

4. A mechanical seal according to claim 3 wherein the drive means is in the form of at least one drive pin fixed to one of the collar and the first portion and extending into a groove, hole or recess located in the other of said collar and said first portion, thereby allowing axial movement therebetween.

* * * * *